United States Patent
Lewandowski et al.

(10) Patent No.: US 9,517,663 B2
(45) Date of Patent: Dec. 13, 2016

(54) TIRE INFLATION SYSTEM HAVING A ROTARY COUPLING

(71) Applicant: ArvinMeritor Technology, LLC, Troy, MI (US)

(72) Inventors: Eric Lewandowski, Summerville, SC (US); Aaron Sinka, Rochester Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 549 days.

(21) Appl. No.: 14/024,819

(22) Filed: Sep. 12, 2013

(65) Prior Publication Data

US 2015/0068654 A1 Mar. 12, 2015

(51) Int. Cl.
*B60C 23/00* (2006.01)

(52) U.S. Cl.
CPC .................................. *B60C 23/003* (2013.01)

(58) Field of Classification Search
CPC ....... B60C 23/10; B60C 23/001; B60C 23/003
USPC .................................................. 152/415–417
See application file for complete search history.

(56) References Cited

U.S. PATENT DOCUMENTS

| | | | |
|---|---|---|---|
| 4,733,707 A * | 3/1988 | Goodell | B60C 23/003 137/224 |
| 6,994,136 B2 | 2/2006 | Stanczak | |
| 7,690,412 B1 | 4/2010 | Jenkinson et al. | |
| 7,931,061 B2 | 4/2011 | Gonska et al. | |
| 8,397,774 B2 * | 3/2013 | Gonska | B60C 23/003 152/417 |
| 8,616,254 B2 | 12/2013 | Kelley et al. | |
| 2012/0186714 A1 | 7/2012 | Richardson | |
| 2012/0234447 A1 | 9/2012 | Narloch et al. | |
| 2015/0059945 A1 * | 3/2015 | Flory | B60C 23/003 152/417 |
| 2015/0075688 A1 * | 3/2015 | Keeney | B60C 23/003 152/417 |
| 2015/0101722 A1 * | 4/2015 | Lakin | B60C 23/003 152/417 |
| 2015/0367690 A1 * | 12/2015 | Keeney | B60C 23/003 152/417 |

FOREIGN PATENT DOCUMENTS

| | | |
|---|---|---|
| EP | 2647511 A2 | 10/2013 |
| WO | 0015451 A1 | 3/2000 |
| WO | 2012045533 A1 | 4/2012 |

OTHER PUBLICATIONS

European Patent Office, Extended European Search Report for the corresponding European Patent Application No. EP 14177860.5 mailed Feb. 9, 2015.
Meritor an ArvinMeritor brand, Meritor Tire Inflation System (MTIS) by PSI(TM), including Meritor ThermALERT(TM), PB-9999, Revised May 2007.

\* cited by examiner

*Primary Examiner* — Jason Bellinger
(74) *Attorney, Agent, or Firm* — Brooks Kushman P.C.

(57) ABSTRACT

A tire inflation system having a rotary coupling. The rotary coupling may have a mounting member and a rotating member. The rotating member may be rotatably coupled to the mounting member and may have a rotating member passage that may fluidly connect a first conduit to a second conduit that may be fluidly connected to the tire.

21 Claims, 2 Drawing Sheets

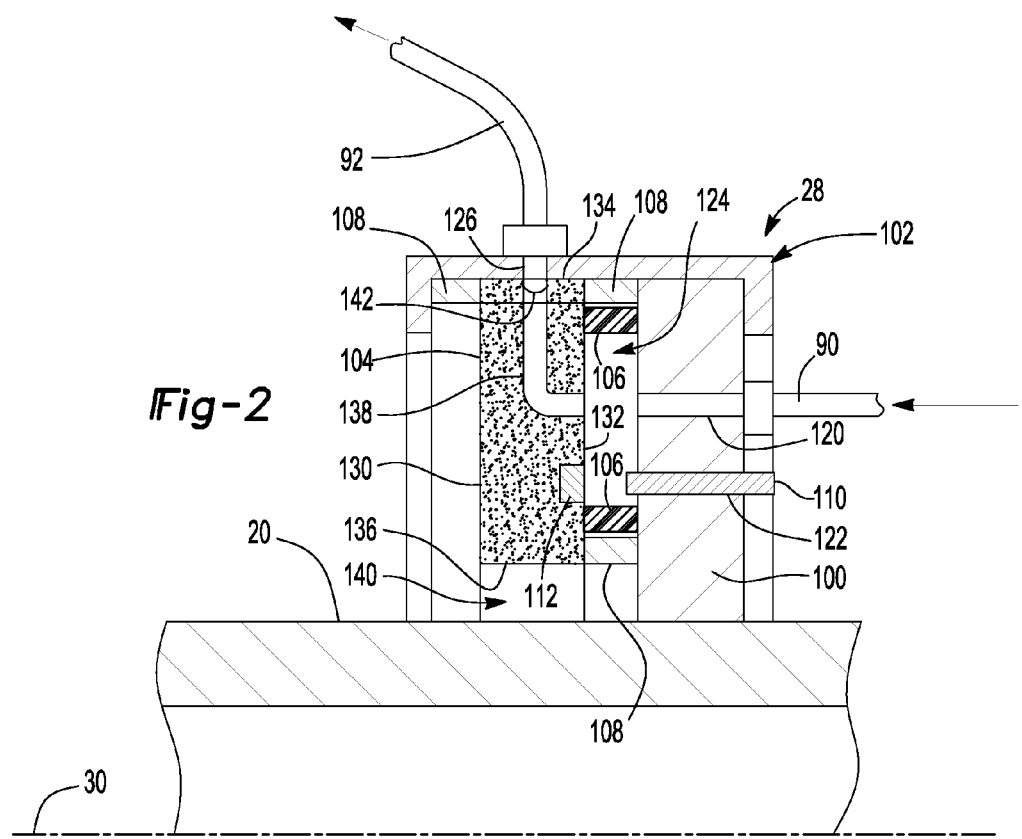
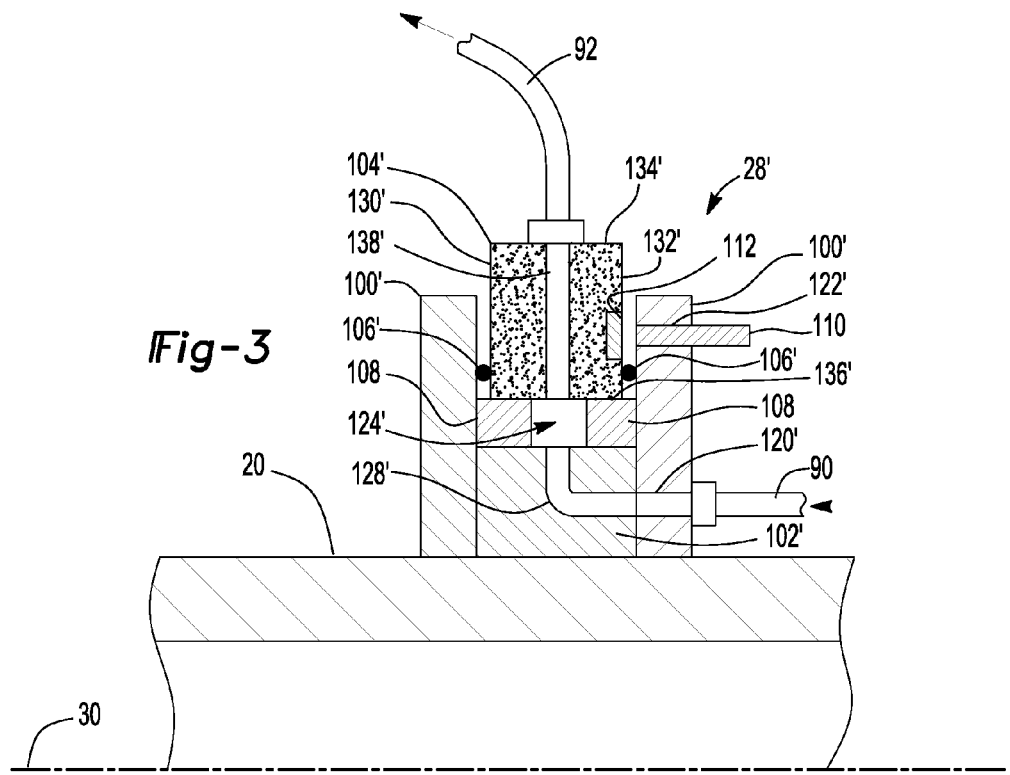

TIRE INFLATION SYSTEM HAVING A ROTARY COUPLING

TECHNICAL FIELD

This patent application relates to a tire inflation system that has a rotary coupling.

BACKGROUND

A tire inflation system is disclosed in U.S. Pat. No. 7,931,061.

SUMMARY

In at least one embodiment, a tire inflation system is provided. The tire inflation system may include a first conduit, an axle housing, and a rotary coupling. The first conduit may supply a pressurized gas for inflating a tire. The rotary coupling may have a mounting member and a rotating member. The mounting member may be disposed proximate the axle housing and the first conduit. The rotating member may be rotatably coupled to the mounting member. The rotating member may have a rotating member passage that may fluidly connect the first conduit to a second conduit that may be fluidly connected to the tire.

In at least one embodiment, a tire inflation system is provided. The tire inflation system may include a first conduit, an axle housing, and a rotary coupling. The first conduit may supply a pressurized gas for inflating a tire. The rotary coupling may include a first mounting member, a block, and a rotating member. The first mounting member may be disposed proximate the axle housing and the first conduit. The block may be disposed proximate the axle housing and the first mounting member. The block may include a block passage that may be fluidly connected to the first conduit. The rotating member may rotate with respect to the mounting member. The rotating member may have a rotating member passage that may fluidly connect the block passage to a second conduit. The second conduit may be fluidly connected to the tire.

BRIEF DESCRIPTION OF THE DRAWINGS

FIGS. 2 and 3 are section views of exemplary rotary couplings that may be provided with the axle assembly.

DETAILED DESCRIPTION

Figure 1:
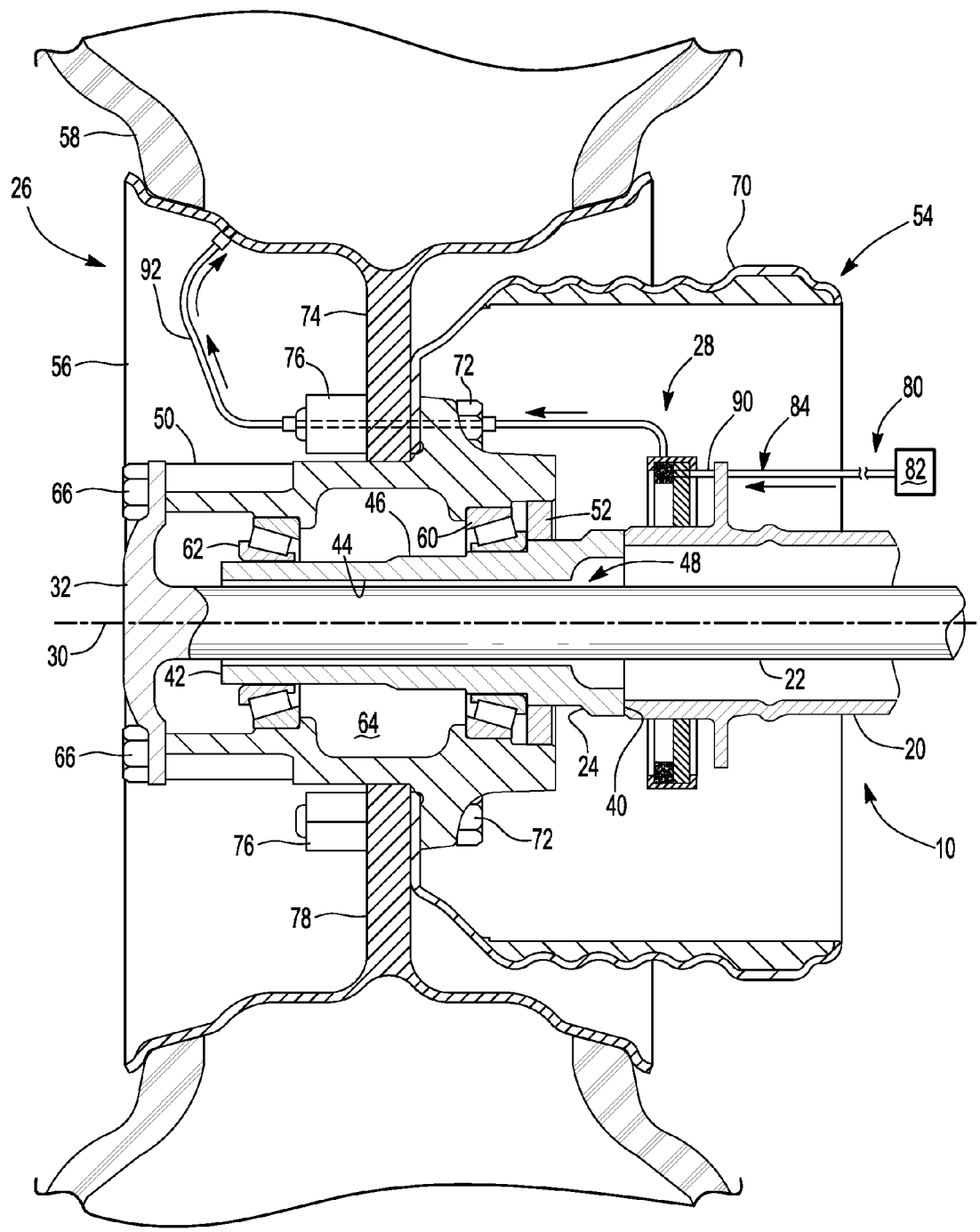
FIG. 1 is a section view of an exemplary axle assembly having a tire inflation system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIG. 1, a portion of an exemplary axle assembly 10 is shown. The axle assembly 10 may be provided with a motor vehicle like a truck, bus, farm equipment, military transport or weaponry vehicle, or cargo loading equipment for land, air, or marine vessels.

The axle assembly 10 may be configured as a drive axle that may receive torque from a power source, such as an internal combustion engine or electric motor. Alternatively, the axle assembly 10 may be configured as a non-drive axle in one or more embodiments. The axle assembly 10 may or may not be steerable. In a drive axle configuration, the axle assembly 10 may include an axle housing 20, an axle shaft 22, a spindle 24, a wheel end assembly 26, and a rotary coupling 28.

The axle housing 20 may receive various components of the axle assembly 10. In addition, the axle housing 20 may facilitate mounting of the axle assembly 10 to the vehicle. The axle housing 20 may define a cavity that may receive at least a portion of the axle shaft 22. The axle housing 20 may include the spindle 24.

The axle shaft 22 may provide torque to the wheel end assembly 26 to propel the vehicle. For instance, the axle shaft 22 may be connected at a first end to a vehicle drivetrain component, like a differential or input shaft, and may be coupled to the wheel end assembly 26 at a second end. In at least one embodiment, the axle shaft 22 may extend along and may rotate about an axis 30. Alternatively, the axle shaft 22 may be configured for use with an independent suspension system and may have multiple shaft segments and/or joints, such as constant-velocity joints, that may facilitate relative movement between the first end and the wheel end assembly 26. The axle shaft 22 may include an axle flange 32 disposed at a distal end. The axle flange 32 may facilitate mounting of the wheel end assembly 26 to the axle shaft 22. In a non-drive axle configuration, the axle shaft 22 may be omitted.

The spindle 24 may be provided with or may be fixedly positioned with respect to the axle assembly 10. The spindle 24 may generally extend along but may not rotate about the axis 30. In a drive axle configuration, the spindle 24 may include a first end surface 40, a second end surface 42, an internal surface 44, an external surface 46, and a hole 48. In a non-drive axle configuration, the internal surface 44 and the hole 48 may be omitted. Moreover, in a steerable non-drive axle configuration, the spindle 24 may be provided with or may be fixedly positioned with respect to a steering knuckle rather than the axle housing 20. The first end surface 40 may be disposed proximate or may engage the axle housing 20. The second end surface 42 may be disposed opposite the first end surface 40 and may be located near the axle flange 32. The internal surface 44 may extend between the first end surface 40 and the second end surface 42 and may at least partially define the hole 48 through which the axle shaft 22 may extend. As such, the spindle 24 may be spaced apart from the axle shaft 22 to permit the axle shaft 22 to rotate about the axis 30. The external surface 46 may be disposed opposite the internal surface 44. The external surface 46 of the spindle 24 may support one or more wheel bearings that may rotatably support the wheel end assembly 26 as will be discussed in more detail below.

The wheel end assembly 26 may be rotatably coupled to the axle shaft 22. The wheel end assembly 26 may include a hub 50, a wheel end seal assembly 52, a brake subsystem 54, a wheel 56, and a tire 58.

The hub 50 may be rotatably disposed on the spindle 24. For instance, one or more wheel bearings may be mounted on spindle 24 and may rotatably support the hub 50. In FIG. 1, a first wheel bearing 60 and a second wheel bearing 62 are provided in a cavity 64 that is located between the spindle 24 and the hub 50. The first wheel bearing 60 may be disposed inboard or further from the second end surface 42 than the second wheel bearing 62. As such, the hub 50 may be configured to rotate about the axis 30. In a drive axle configuration, the axle flange 32 may be coupled to the hub 50 with one or more fasteners 66. As such, the hub 50 may rotate with the axle shaft 22. In a non-drive axle configuration, the hub 50 may not be coupled to an axle shaft 22 or axle flange 32.

The wheel end seal assembly 52 may be disposed between the spindle 24 and the hub 50. The wheel end seal assembly 52 may inhibit contaminants from entering the cavity 64 and may help retain lubricant in the cavity 64. In at least one embodiment, the wheel end seal assembly 52 may be fixedly disposed with respect to the hub 50 and may rotate about the axis 30 and with respect to the spindle 24.

The brake subsystem 54 may be adapted to slow or inhibit rotation of at least one associated wheel 56. For example, the brake subsystem 54 may be configured as a friction brake, such as a drum brake or a disc brake. In FIG. 1, a portion of the brake subsystem 54 is shown with a drum brake configuration. In a drum brake configuration, a brake drum 70 may be fixedly disposed on the hub 50 with one or more fasteners 72, such as wheel lug studs. The brake drum 70 may extend continuously around brake shoe assemblies (not shown) that may be configured to engage the brake drum 70 to slow rotation of an associated wheel 56.

The wheel 56 may be fixedly disposed on the hub 50. For example, the wheel 56 may be mounted on the hub 50 via the fasteners 72. More specifically, the wheel 56 may have a wheel mounting flange 74 that may have a set of holes that may each receive a fastener 72. In at least one embodiment, a fastener 72 may be hollow or have a through hole that facilitates the routing of pressurized gas through the fastener 72. A lug nut 76 may be threaded onto each fastener to secure the wheel 56 to the fasteners 72 and the hub 50. The lug nut 76 may engage or may be disposed proximate an outboard side 78 of the wheel mounting flange 74 that faces way from the brake drum 70 or toward the axle flange 32. The wheel 56 may be configured to support the tire 58. The tire 58 may be a pneumatic tire that may be inflated with a pressurized gas or pressurized gas mixture.

A tire inflation system 80 may be associated with the wheel end assembly 26. The tire inflation system 80 may be disposed on the vehicle and may be configured to provide a pressurized gas or pressurized gas mixture to one or more tires 58. For clarity, the term "pressurized gas" may refer to either a pressurized gas or a pressurized gas mixture. The tire inflation system 80 may include a control system that may monitor and control the inflation of one or more tires 58, a pressurized gas source 82, and a gas supply subsystem 84.

The pressurized gas source 82 may be configured to supply or store a volume of a pressurized gas or pressurized gas mixture, like air or nitrogen. For example, the pressurized gas source 82 may be a tank and/or a pump like a compressor. The pressurized gas source 82 may be disposed on the vehicle and may provide a pressurized gas or pressurized gas mixture at a pressure that is greater than or equal to a desired inflation pressure of a tire 58. As such, the pressurized gas source 82 may inflate a tire or maintain a desired tire pressure.

The gas supply subsystem 84 may fluidly connect the pressurized gas source 82 to the tire 58. The gas supply subsystem 84 may include one or more conduits, such as a hose, tubing, pipe, or combinations thereof. In FIG. 1, a first conduit 90 and a second conduit 92 are shown. The first conduit 90 may be fluidly connected to and may receive pressurized gas from the pressurized gas source 82. The second conduit 92 may supply pressurized gas to the tire 58. In at least one embodiment, the second conduit 92 may extend through the hole in the fastener 72 or may be separated into segments. For example, a first segment may extend from the rotary coupling 28 to the fastener 72 and a second segment may extend from the fastener 72 to the wheel 56 and/or tire 58. In addition, one or more valves may be associated with or provided with a conduit to enable or disable the flow of the pressurized gas from the pressurized gas source 82 to one or more tires 58. The routing of the conduits between the pressurized gas source 82 and a tire 58 is exemplary and is not meant to be limiting as other conduit routing paths may be provided. The flow of pressurized gas is represented by the arrows in the conduits in FIG. 1.

Referring to FIGS. 2 and 3, exemplary rotary couplings are shown. A rotary coupling may facilitate routing of pressurized gas from the pressurized gas source 82 to the tire 58 while allowing the wheel end assembly 26 to rotate about the axis 30. For instance, the rotary coupling may receive pressurized gas from the pressurized gas source 82 via a first conduit 90 and may fluidly connect the first conduit 90 to the second conduit 92. In at least one embodiment, the rotary coupling may be disposed between the pressurized gas source 82 and the hub 50. In addition, the rotary coupling may be spaced apart from the wheel end assembly 26 and associated components, such as the hub 50 and wheel end seal assembly 52.

Referring to FIG. 2, a first embodiment of a rotary coupling 28 is shown. The rotary coupling 28 may include at least one mounting member 100, a bracket 102, a rotating member 104, one or more seals 106, one or more bearings 108, a tone ring sensor 110, and a tone ring 112.

The mounting member 100 may facilitate mounting of the rotary coupling 28. For example, the mounting member 100 may be fixedly disposed on a component that may be stationary with respect to the axis 30, such as the axle housing 20 and/or spindle 24. In the embodiment shown in FIG. 2, the mounting member 100 is disposed on the axle housing 20 and may extend radially or substantially perpendicular to the axis 30. The mounting member 100 may be attached to the axle housing 20 and/or spindle 24 in any suitable manner, such as by welding or with one or more fasteners. The mounting member 100 may include a passage 120 and a tone ring sensor hole 122.

The passage 120 may extend through the mounting member 100 to a chamber 124 that may be disposed between the mounting member 100 and the rotating member 104. In at least one embodiment, the chamber 124 may be disposed between a pair of bearings 108 that may be disposed between the mounting member 100 and the rotating member 104. The chamber 124 may extend continuously around the axis 30 in a ring-like manner in one or more embodiments.

The tone ring sensor hole 122 may be configured as a through hole that may extend through the mounting member 100. The tone ring sensor hole 122 may be spaced apart from the passage 120 and may receive the tone ring sensor 110.

The bracket 102 may position and hold the rotating member 104. The bracket 102 may be fixedly disposed on the mounting member 100. As such, the bracket 102 may not rotate with the hub 50 and/or the rotating member 104 in one or more embodiments.

The bracket 102 may be provided in various configurations. In FIG. 2, a bracket 102 is shown that may position and/or hold the rotating member 104 against a pair of bearings 108 that may be disposed between the mounting member 100 and the rotating member 104. As such, the bracket 102 may hold the rotating member 104 against the bearings 108 such that leakage of pressurized gas between the rotating member 104 and the bearings 108 is inhibited.

A single bracket 102 may extend continuously around the axis 30 in a ring-like manner or a plurality of brackets 102 may be provided that may be spaced apart from each other and arranged around the axis 30 to hold the rotating member against the bearings 108. The bracket 102 may be secured to the mounting member 100 in any suitable manner, such as by welding or with one or more fasteners.

The bracket 102 may include a gas passage opening 126. In FIG. 2, the gas passage opening 126 is configured as a through hole and extends generally away from the axis 30. The gas passage opening 126 may receive pressurized gas from the rotating member 104 and permit pressurized gas to flow through the gas passage opening 126 to the second conduit 92. The gas passage opening 126 may be omitted in various embodiments, such as when pressurized gas is routed through the rotating member 104, rather than through the rotating member 104 and the bracket 102.

The rotating member 104 may fluidly connect the chamber 124 to the second conduit 92. The rotating member 104 may be configured as a ring that may extend continuously around the spindle 24 and the axis 30. In at least one embodiment, the rotating member 104 may have a first rotating member surface 130, a second rotating member surface 132, an outer rotating member surface 134, an inner rotating member surface 136, and a rotating member passage 138.

The first rotating member surface 130 may face away from the mounting member 100. The first rotating member surface 130 may be disposed proximate a bearing 108 that may be disposed between the bracket 102 and the rotating member 104.

The second rotating member surface 132 may face toward the mounting member 100. The second rotating member surface 132 may be spaced apart from the mounting member 100 and may at least partially define the chamber 124. In addition, the tone ring 112 may be disposed proximate the second rotating member surface 132. In FIG. 2, the tone ring 112 is disposed in a groove in the second rotating member surface 132.

The outer rotating member surface 134 may extend from the first rotating member surface 130 to the second rotating member surface 132. The outer rotating member surface 134 may be spaced apart from the inner rotating member surface 136 and may at least partially define an outside surface or outside circumference of the rotating member 104. The outer rotating member surface 134 may be disposed proximate or may engage the bracket 102 to help position the rotating member 104 and inhibit movement of the rotating member 104 away from the axis 30.

The inner rotating member surface 136 may be disposed opposite the outer rotating member surface 134. The inner rotating member surface 136 may face toward the axis 30 and may at least partially define an inside surface or inside circumference of the rotating member 104. In the embodiment shown in FIG. 2, the inner rotating member surface 136 may be spaced apart from the axle housing 20 and/or spindle 24 to facilitate rotation of the rotating member 104 about the axis 30 and with respect to the axle housing 20 and/or spindle 24. As such, a gap 140 may be present between the axle housing 20 and the inner rotating member surface 136.

The rotating member passage 138 may be configured as a through hole that may extend through the rotating member 104. In the embodiment shown in FIG. 2, the rotating member passage 138 extends from the second rotating member surface 132 to the outer rotating member surface 134. Alternatively, the rotating member passage 138 may extend through the rotating member 104 in a different manner. For example, the rotating member passage 138 may extend from the first rotating member surface 130 to the second rotating member surface 132. The rotating member passage 138 may include a rotating member groove 142. The rotating member groove 142 may be provided with the outer rotating member surface 134 and may face toward the bracket 102. The rotating member groove 142 may extend continuously around the axis 30 in a ring-like manner. As such, the rotating member groove 142 may distribute pressurized gas around the axis 30 and permit pressurized gas to flow through an opening in the mounting bracket 120 as the rotating member 104 rotates with respect to the mounting member 100 and/or bracket 102. In addition, the rotating member groove 142 may allow for a continuous fluid connection between the rotating member passage 138 and the second conduit 92 independent of the rotational position of the rotating member 104.

One or more seals 106 may be provided to inhibit leakage of pressurized gas from the chamber 124. In the embodiment shown in FIG. 2, two seals 106 are shown that are spaced apart from each other and disposed between the bearings 108 that are provided between the mounting member 100 and the rotating member 104. Alternatively, the position of a seal 106 and a bearing 108 may be reversed such that the seal 106 may be disposed outside a bearing 108. A seal 106 may extend around the axis 30 and from the mounting member 100 to the rotating member 104. In addition, the seal 106 may be spaced apart from a bearing 108 in one or more embodiments. Optionally, seal functionality may be incorporated with one or more bearings 108 in addition to or in place of a separate seal 106.

One or more bearings 108 may be provided to facilitate rotation of the rotating member 104 with respect to the mounting member 100 and/or bracket 102. In the embodiment shown in FIG. 2, three bearings 108 are shown. More specifically, two bearings 108 are provided between the mounting member 100 and the rotating member 104 and one bearing 108 is provided between the rotating member 104 and the bracket 102. The bearings 108 between the mounting member 100 and bracket 102 may at least partially define the chamber 124 and may be configured to inhibit leakage of pressurized gas from the chamber 124. In addition, the bearings 108 may facilitate rotation of the rotating member 104 about the axis 30. The third bearing 108, if provided, may be disposed between the first rotating member surface 130 and the bracket 102 to help inhibit axial movement of the rotating member 104, or movement of the rotating member 104 in a direction that extends generally along or parallel to the axis 30.

The tone ring sensor 110 may be provided with an antilock brake system and may be configured to detect rotation of the wheel end assembly 26 about the axis 30. The tone ring sensor 110 may detect features that may be provided with the tone ring 112. For instance, the tone ring 112 may have a plurality of openings that may be spaced apart from each other. The tone ring sensor 110 may detect the presence or absence of an opening in the tone ring 112 and may provide a corresponding signal that may be indicative of rotation of the hub 50 and wheel 56.

Referring to FIG. 3, another version of a rotary coupling 28' is shown. The rotary coupling 28' may include at least one mounting member 100', a block 102', a rotating member 104' and one or more seals 106'. In addition, the rotary coupling 28' may include one or more bearings 108, a tone ring sensor 110, and a tone ring 112 as previously described.

The mounting member 100' may facilitate mounting of the rotary coupling 28'. In FIG. 3, two mounting members 100' are shown that are spaced apart from each other. The mounting members 100' may be fixedly disposed on a component that may be stationary with respect to the axis 30, such as the axle housing 20 and/or spindle 24. For convenience in reference, the mounting member 100' located to the left in FIG. 3, may be referred to as a first mounting member 100' and the mounting member located to the right in FIG. 3 may be referred to as a second mounting member 100'. The mounting member 100' may be attached to the axle housing 20 and/or the spindle 24 in any suitable manner, such as by welding or with one or more fasteners. A mounting member 100' may include a passage 120' and a tone ring sensor hole 122'. The passage 120' may extend through the mounting member 100' to or toward the block 102'. The tone ring sensor hole 122' may extend through a mounting member 100' toward the rotating member 104' and may receive the tone ring sensor 110.

A chamber 124' may be disposed between the mounting members 100'. In at least one embodiment, the chamber 124' may be spaced apart from the mounting members 100' and disposed between a pair of bearings 108 that may be disposed proximate the mounting member 100'. The chamber 124' may also be disposed between the block 102' and the rotating member 104'. The chamber 124' may extend continuously around the axis 30 in a ring-like manner in one or more embodiments.

The block 102' may be disposed proximate or adjacent to at least one mounting member 100'. In addition, the block 102' may be disposed proximate or adjacent to a stationary component, such as the axle housing 20 and/or the spindle 24. In at least one embodiment, the block 102' may be stationary or fixedly positioned with respect to the axle housing 20, spindle 24, and/or mounting member 100'. The block 102' may include a block passage 128'. The block passage 128' may extend through the block 102' and may fluidly connect the passage 120' to the chamber 124'. In FIG. 3, the block passage 128' has an inlet that is disposed adjacent to the passage 120' and an outlet that is disposed between the bearings 108.

The rotating member 104' may fluidly connect the chamber 124' to the second conduit 92. The rotating member 104' may be configured as a ring that may extend continuously around the spindle 24, the axis 30, and/or the block 102'. In at least one embodiment, the rotating member 104' may have a first rotating member surface 130', a second rotating member surface 132', an outer rotating member surface 134', an inner rotating member surface 136', and a rotating member passage 138'.

The first rotating member surface 130' may face toward and may be disposed proximate the first mounting member 100'. The second rotating member surface 132' may face toward and may be disposed proximate the second mounting member 100'. The first and second mounting members 100' may cooperate with the first and second rotating member surfaces 130', 132' and/or the seals 106' to inhibit axial movement of the rotating member 104'. In addition, the tone ring 112 may be disposed proximate the second rotating member surface 132'.

The outer rotating member surface 134' may extend from the first rotating member surface 130' to the second rotating member surface 132'. The outer rotating member surface 134' may be spaced apart from the inner rotating member surface 136' and may at least partially define an outside surface or outside circumference of the rotating member 104'. The outer rotating member surface 134' may be disposed proximate or may engage the second conduit 92.

The inner rotating member surface 136' may be disposed opposite the outer rotating member surface 134'. The inner rotating member surface 136' may face toward the axis 30 and may at least partially define an inside surface or inside circumference of the rotating member 104'. In the embodiment shown in FIG. 3, the inner rotating member surface 136' may face toward and may engage the bearings 108 and may at least partially define a chamber 124'. The inner rotating member surface 136' may be spaced apart from the block 102' to facilitate rotation of the rotating member 104' about the axis 30 and with respect to the axle housing 20 and/or spindle 24.

The rotating member passage 138' may be configured as a through hole that may extend through the rotating member 104'. In the embodiment shown in FIG. 3, the rotating member passage 138' extends from the inner rotating member surface 136' to the outer rotating member surface 134'. Alternatively, the rotating member passage 138' may extend through the rotating member 104' in a different manner, such as out of the first or second rotating member surfaces 130', 132' in a location that is spaced apart from a mounting member 100'.

One or more seals 106' may be provided to inhibit leakage of pressurized gas from the chamber 124'. In the embodiment shown in FIG. 2, two seals 106' are shown that are spaced apart from each other and disposed between the mounting member 100' and the rotating member 104'. A first seal 106' may engage and may be disposed between the first mounting member 100' and the rotating member 104'. A second seal 106' may engage and may be disposed between the second mounting member 100' and the rotating member 104'. A seal 106' may extend around the axis 30 and may be spaced apart from a bearing 108 in one or more embodiments. Optionally, seal functionality may be incorporated with the rotating member 104' through engagement with a mounting member 100' or with one or more bearings 108 in addition to or in place of a separate seal 106'.

One or more bearings 108 may be provided to facilitate rotation of the rotating member 104' with respect to the mounting member 100' and/or the block 102'. In the embodiment shown in FIG. 3, two bearings 108 are shown that are provided between the mounting members 100' and between the block 102' and the rotating member 104'.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A tire inflation system comprising:
   a first conduit for supplying a pressurized gas for inflating a tire;
   an axle housing;
   a hub that is rotatably disposed on the axle housing; and
   a rotary coupling that is axially spaced apart from the hub and includes:
      a mounting member that is disposed proximate the axle housing and the first conduit;
      a rotating member that is rotatably coupled to the mounting member, wherein the rotating member has a rotating member passage that fluidly connects the first conduit to a second conduit that is fluidly connected to the tire; and a mounting bracket that is fixedly disposed on the mounting member and that radially extends around the rotating member to help position the rotating member.

2. The tire inflation system of claim 1 wherein the mounting member is fixedly disposed on the axle housing.

3. The tire inflation system of claim 1 wherein the rotating member is spaced apart from the mounting member such that a chamber is formed between the mounting member and the rotating member, wherein the chamber fluidly connects the first conduit to the rotating member passage.

4. The tire inflation system of claim 3 wherein the mounting member has a passage that fluidly connects the first conduit to the chamber.

5. The tire inflation system of claim 1 further comprising a bearing that is disposed between the mounting member and the rotating member that facilitates rotation of the rotating member with respect to the mounting member.

6. The tire inflation system of claim 1 wherein the rotating member extends around and is spaced apart from the axle housing.

7. The tire inflation system of claim 6 wherein the rotating member has an inner rotating member surface that faces toward and is spaced apart from the axle housing.

8. The tire inflation system of claim 1 wherein the rotating member includes a rotating member groove that extends continuously around an axis and that fluidly connects the rotating member passage to the second conduit.

9. The tire inflation system of claim 1 wherein the rotating member rotates with respect to the mounting member.

10. The tire inflation system of claim 9 wherein the mounting bracket has a gas passage opening that connects the rotating member passage to the second conduit.

11. The tire inflation system of claim 9 further comprising a bearing that is disposed between the mounting bracket and the rotating member.

12. The tire inflation system of claim 1 wherein the second conduit extends through a wheel that supports the tire.

13. A tire inflation system comprising:
a first conduit for supplying a pressurized gas for inflating a tire;
an axle housing; and
a rotary coupling that includes:
a mounting member that is disposed proximate the axle housing and the first conduit;
a rotating member that rotates about an axis and is rotatably coupled to the mounting member, wherein the rotating member has a rotating member passage that fluidly connects the first conduit to a second conduit that is fluidly connected to the tire and a rotating member groove that extends continuously around the axis and is disposed on an outer rotating member surface that extends around the axis; and
a mounting bracket that is fixedly disposed on the mounting member and that engages the outer rotating member surface.

14. The tire inflation system of claim 13 wherein the rotating member groove faces toward the mounting bracket and provides pressurized gas to the second conduit.

15. The tire inflation system of claim 13 wherein the rotary coupling is axially spaced apart from and does not engage a wheel end assembly having a hub that rotates about the axis and that supports a wheel that supports the tire.

16. A tire inflation system comprising:
a first conduit for supplying a pressurized gas for inflating a tire;
an axle housing; and
a rotary coupling that includes:
a mounting member that is disposed proximate the axle housing and the first conduit;
a rotating member that is rotatably coupled to the mounting member, wherein the rotating member has a rotating member passage that fluidly connects the first conduit to a second conduit that is fluidly connected to the tire;
a mounting bracket that is fixedly disposed on the mounting member and that radially extends around the rotating member to help position the rotating member; and
a pair of bearings that are disposed between the mounting member and the rotating member, wherein the pair of bearings facilitates rotation of the rotating member with respect to the mounting member.

17. The tire inflation system of claim 16 wherein the pair of bearings extends from the mounting member to the rotating member.

18. The tire inflation system of claim 16 further comprising a third bearing disposed between the rotating member and the mounting bracket.

19. The tire inflation system of claim 18 wherein the third bearing extends from the rotating member to the mounting bracket.

20. The tire inflation system of claim 16 wherein the rotary coupling is rotatable about an axis and is axially spaced apart from and does not engage a wheel end assembly having a hub that rotates about the axis and that supports a wheel that supports the tire.

21. The tire inflation system of claim 16 wherein the rotary coupling is rotatable about an axis and a pair of seals extend around the axis and extend from the mounting member to the rotating member such that the pair of seals is disposed between the pair of bearings.

* * * * *